United States Patent
Nichols (10) Patent No.: US 10,174,783 B1
(45) Date of Patent: Jan. 8, 2019

(54) SYSTEM FOR PROTECTING EQUIPMENT SURFACES

(71) Applicant: PRECISION PIPING PRODUCTS, LLC, Houston, TX (US)

(72) Inventor: Byron Keith Nichols, Houston, TX (US)

(73) Assignee: PRECISION PIPING PRODUCTS, LLC, Houston, TX (US)

( * ) Notice: Subject to any disclaimer, the term of this patent is extended or adjusted under 35 U.S.C. 154(b) by 50 days.

(21) Appl. No.: 15/467,587

(22) Filed: Mar. 23, 2017

Related U.S. Application Data (60) Provisional application No. 62/311,966, filed on Mar. 23, 2016, provisional application No. 62/434,541, filed on Dec. 15, 2016.

(51) Int. Cl.
*B65D 59/06* (2006.01)
*F16B 43/00* (2006.01)
*F16B 5/02* (2006.01)
*F16B 37/00* (2006.01)
*F16L 57/00* (2006.01)

(52) U.S. Cl.
CPC .......... *F16B 43/001* (2013.01); *F16B 5/0241* (2013.01); *F16B 37/00* (2013.01); *F16L 57/005* (2013.01)

(58) Field of Classification Search
CPC ....... F16L 57/005; E03D 11/16; Y10T 74/219
USPC ....... 138/98, 96 R; 411/354, 366.1, 397, 427
See application file for complete search history.

(56) References Cited

U.S. PATENT DOCUMENTS

| | | | | |
|---|---|---|---|---|
| 3,856,050 A | * | 12/1974 | Rooney | F16L 57/005 138/96 R |
| 4,233,697 A | * | 11/1980 | Cornwall | E03D 11/16 138/89 |
| 4,547,108 A | * | 10/1985 | Nakama | F16B 37/0842 411/374 |
| 4,799,716 A | * | 1/1989 | Kujawa | B65D 59/06 138/89 |
| 4,896,895 A | * | 1/1990 | Bettosini | A63C 5/075 280/607 |
| 5,546,989 A | | 8/1996 | Bowes | |
| 6,515,045 B1 | * | 2/2003 | Cullen | C08J 3/03 523/404 |
| 6,532,992 B1 | * | 3/2003 | Holden | F16L 57/005 138/89 |
| 6,725,468 B2 | * | 4/2004 | Molina | E03D 11/16 138/89 |
| 7,877,948 B2 | * | 2/2011 | Davies | B60R 13/01 411/354 |

(Continued)

*Primary Examiner* — Patrick F Brinson
(74) *Attorney, Agent, or Firm* — Rao DeBoer Osterrieder, PLLC; Dileep P. Rao (57) ABSTRACT

A system for protecting an equipment surface during manufacture, fabrication, transport, storage, and installation of equipment. The system comprises an adhered surface cover to mechanically protect machined surfaces, as well as hermetically sealing any covered openings. An impact absorbing cover with a deforming layer can be attached with a fastener to provide further impact protection for the equipment surface. The system has the benefit of being lightweight to allow for easy handling and shipping, is safer to use than other methods known in the art, and has the coincident benefit of protecting larger systems that equipment is a component of.

14 Claims, 6 Drawing Sheets

(56) References Cited

U.S. PATENT DOCUMENTS

| | | | |
|---|---|---|---|
| 8,832,919 B2* | 9/2014 | Ivinson | F16B 37/0842 |
| | | | 29/505 |
| 9,217,460 B2* | 12/2015 | Manahan | E05B 65/001 |
| 9,551,141 B2* | 1/2017 | Clinton | E03F 5/041 |
| 9,970,587 B2* | 5/2018 | Armenta | E03D 11/16 |

* cited by examiner

SYSTEM FOR PROTECTING EQUIPMENT SURFACES

CROSS REFERENCE TO RELATED APPLICATION

The current application claims priority to U.S. Provisional Patent Application Ser. No. 62/311,966 filed on Mar. 23, 2016, entitled "FLANGE PROTECTOR AND METHOD OF PROTECTING A MACHINED SURFACE OF A FLANGE". The current application also claims priority to U.S. Provisional Patent Application Ser. No. 62/434,541 filed on Dec. 15, 2016, entitled "FASTENING DEVICE". These references are hereby incorporated in their entirety.

FIELD

The present embodiments generally relate to a system for protecting equipment surfaces during manufacture, fabrication, transport, storage, and installation.

BACKGROUND

Many pieces of equipment have surfaces that need to be protected during the various stages of manufacture, fabrication, transport, storage, and installation. Often, surfaces need to be maintained at specific tolerances and kept free of dirt and grit, as well as being protected from damage.

An exemplary apparatus to which such requirements apply is an equipment flange, and more specifically a raised face surface on a flange. In order to explain the present invention with clarity, embodiments will be discussed with respect to a raised face flange. However, the present invention is equally applicable to other surfaces in need of similar protection. Any machined surface requiring protection from debris, contamination, mechanical impact, or other undesirable occurrences can make use of the present invention.

Raised face flanges are machined surfaces which are used commonly in the industry to mate pieces of equipment. Often, such flanges, and other surfaces requiring protection, need to maintain tight tolerances in order to provide a sealing surface. Exemplary pieces of equipment include, but are not limited to: pipe segments, pumps, compressors, engines, heat exchangers, and the like.

Equipment can undergo various steps during manufacture, fabrication, transport, storage, and installation. For example, after a raised face of a flange is manufactured and machined, it is often desirable to abrasively blast and paint the non-machined surfaces. It is desirable, therefore to protect the machined surfaces during treatment, or other manipulation of the non-machined surfaces.

Often the raised faces of the flange need to be maintained at critical tolerances and kept free of dirt and grit to maintain an effective sealing surface when mated with other pieces of equipment.

Furthermore, when flanges are components of large and often expensive pieces of equipment, it is desirable to seal the flange to prevent incursion of debris into the equipment during manufacture, fabrication, transport, storage, and installation. Also, the equipment may in turn become a component of a larger, also expensive, system. It is desirable to prevent debris and contaminants for entering the equipment which can cause damage, or otherwise affect the performance of the equipment or attached systems.

It is also desirable to protect raised faces of flanges and internal components of equipment from corrosion during manufacture, fabrication, transport, and storage. Often, a corrosion inhibitor is inserted into equipment and it is desirable for the flange to be sealed.

In addition, it is desirable to protect flanges and equipment from mechanical impacts during manufacture, fabrication, transport, storage, and installation.

Whether from airborne debris during transport, tools inadvertently striking the equipment, or impacts during loading or unloading of the equipment, and the like, various mechanical impacts are possible to the machined surfaces which may render the surface unsuitable for its intended purpose.

Presently used methods are inefficient, or add needless cost to equipment during the various stages of manufacture, fabrication, transport, storage, and installation. Present methods add significant weight to the equipment, thereby increasing transportation costs. Also, present methods result in significant waste of materials.

A need exists, therefore for an efficient and durable method to protect machined surfaces of equipment to withstand various activities and stresses during manufacture, fabrication, transport, storage, and installation.

A further need exists for a durable and versatile system able to protect machined surfaces of various sizes.

The present invention meets the above needs.

BRIEF DESCRIPTION OF THE DRAWINGS

The detailed description will be better understood in conjunction with the accompanying drawings as follows.

The present invention is detailed below with reference to the listed Figures.

DETAILED DESCRIPTION OF THE EMBODIMENTS

Before explaining the present invention in detail, it is to be understood that the invention is not limited to the specifics of particular embodiments as described and that it can be practiced, constructed, or carried out in various ways.

While embodiments of the disclosure have been shown and described, modifications thereof can be made by one skilled in the art without departing from the spirit and teachings of the disclosure. The embodiments described herein are exemplary only, and are not intended to be limiting.

Specific structural and functional details disclosed herein are not to be interpreted as limiting, but merely as a basis of the claims and as a representative basis for teaching persons having ordinary skill in the art to variously employ the present invention. Many variations and modifications of embodiments disclosed herein are possible and are within the scope of the present disclosure.

Where numerical ranges or limitations are expressly stated, such express ranges or limitations should be understood to include iterative ranges or limitations of like magnitude falling within the expressly stated ranges or limitations.

The use of the word "a" or "an" when used in conjunction with the term "comprising" in the claims and/or the specification may mean "one," but it is also consistent with the meaning of "one or more," "at least one," and "one or more than one."

The use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description herein, but is only limited by the claims which follow, encompassing all equivalents of the subject matter of the claims. Each and every claim is incorporated into the specification as an embodiment of the present disclosure. Thus, the claims are a further description and are an addition to the preferred embodiments of the present disclosure.

The inclusion or discussion of a reference is not an admission that it is prior art to the present disclosure, especially any reference that may have a publication date after the priority date of this application. The disclosures of all patents, patent applications, and publications cited herein are hereby incorporated by reference, to the extent they provide background knowledge; or exemplary, procedural or other details supplementary to those set forth herein.

The present embodiments generally relate to a system for protecting equipment surfaces during manufacture, fabrication, transport, storage, and installation.

The system for protecting an equipment surface can comprise an adhered surface cover, an impact absorbing cover, and a fastener for attaching the impact absorbing cover to the equipment surface.

In embodiments, the adhered surface cover can be sized to cover only the machined surface of the equipment intending to be protected. This allows for other manufacturing, fabrication, or treatment processes to be performed to other portions of the equipment. For example, by sizing the adhered surface cover to the machined surface, other portions of the equipment can be abrasively blasted and painted without damage or contamination of the machined surface.

In prior art, coverings to the machine surface have been made with the use of duct tape or other masking tape. This is undesirable in many instances, as removal often leaves a residue on the machined surface that must be removed. Further, this does not establish a hermetic, or airtight seal protecting the internals of the equipment.

In embodiments, the adhered surface cover comprises a water based adhesive, thereby allowing the adhered surface cover to be removed without leaving behind any residue. However, the adhered surface cover need not comprise any adhesive and can be adhered to a machined surface in any manner desired by persons having ordinary skill in the art.

The present invention is superior to the prior art in its ability to hermetically seal internal components of equipment while protecting machined surfaces. Further, removal of the present invention does not leave a residue, but instead leaves a clean machined surface ready to be installed for service.

Further, in embodiments, the adhered surface cover is configured to provide an airtight seal. The adhered surface cover can, therefore prevent impingement of moisture into the equipment, for example when covering the flange of a pump. Further, this provides the advantage of sealing desirable products in the equipment, such as when a corrosion inhibitor is placed within equipment, such as pipes, compressors, pumps, and the like.

In embodiments, the adhered surface cover comprises a thermoplastic material. Exemplary materials include, but are not limited to: a fluoropolymer, an acrylic, an acrylonitrile butadiene styrene, a nylon, a polylactic acid, a polybenzimidazole, a polycarbonate, a polyether sulfone, a polyether ether ketone, a polyetherimide, a polyethylene, a polyphenylene oxide, a polyphenylene sulfide, a polypropylene, a polyester, a polystyrene, or a polyvinyl chloride.

While other materials can be utilized as desired by persons having ordinary skill in the art, a material comprising a thermoplastic is desirable due to generally possessed characteristics thereof. Many materials comprising thermoplastics are lightweight, airtight, and durable. Further, such materials are able to withstand wide ranges of temperatures or weather conditions without deforming or degrading, and further will not degrade when exposed to ultraviolet light. In a preferred embodiment, acrylonitrile butadiene styrene can be used for the adhered surface cover.

The adhered surface cover preferably includes the above characteristics. It is preferably lightweight to minimize shipping costs, and to allow for easy handling. The adhered surface cover is preferably airtight to prevent dirt or moisture from entering equipment, thereby necessitating a cleaning or allowing for corrosion to occur. Further, the adhered surface cover is preferably capable of withstanding a wide range of temperature and exposure to ultraviolet light to allow for transport when exposed (such as on a flatbed truck) or storage in open air.

Also, the adhered surface cover can be configured to withstand abrasive blasting. Again, a material comprising a thermoplastic is desirable due to its durability in conjunction with being lightweight and airtight. The adhered surface cover also provides a modicum of impact protection to the machined surface.

As discussed above, while singular issues may be addressed with other solutions, methods currently used in the art fail to perform all of the functions that the adhered surface cover performs.

The system for protecting an equipment surface can comprise an impact absorbing cover. The impact absorbing cover acts as a bumper to protect both the machined surface as well as the equipment from inadvertent impacts during manufacture, fabrication, transport, storage, and installation of the equipment.

In embodiments, the impact absorbing cover comprises a deforming layer. The deforming layer can act analogously to an automobile bumper, but crumpling and absorbing the force of mechanical impacts. In this manner, machined surfaces as well as equipment can be protected from receiving the full force of an impact. The impact absorbing cover can be used in conjunction with the adhered surface cover, to enhance the impact resistant capabilities of the adhered surface cover.

In embodiments, the impact absorbing cover comprises a thermoplastic. A thermoplastic is a desirable material for the same reasons as discussed above, i.e. it is lightweight, durable, and able to withstand ultraviolet light, and wide ranges of temperatures or weather conditions without deforming or degrading.

In embodiments, the impact absorbing cover comprises a rigid layer adjacent to the deforming layer. The rigid layer can be a metal, such as aluminum. The rigid layer can be coated to prevent corrosion or other degradation. For example, the rigid layer can be painted, which can also allow for advertising messages, safety messages, and the like to be incorporated.

It is desirable to construct the impact absorbing cover in layers in order to maximize the ability to absorb impacts. Embodiments can have deforming layers adjacent to rigid layers to accomplish this purpose. In embodiments, multiple deforming layers can be utilized.

In a preferred embodiment, the impact absorbing cover makes use of high density polyethylene for the deforming layer and aluminum for the rigid layer.

Currently in the art, plywood is often utilized to protect machined surfaces. While plywood is a layered material that provides effective impact protection, plywood can rot or warp, as well as become infested with insects. Steel plates are also often used to protect machined surfaces. This adds considerable weight and cost to transporting equipment, while adding the risk of damaging equipment when attaching or removing the protective plate. Further, heavy protective coverings can pose a safety risk to personnel during handling and installation of equipment.

The present invention allows for a safe, efficient, and rapid usage of lightweight protective coverings for machined surfaces.

The system for protecting an equipment surface can comprise a fastener to attach the impact absorbing cover to equipment. Any fastener known to persons having ordinary skill in the art can be utilized. For example, a nut and bolt is a typical fastener utilized for flanges.

In embodiments, a self-adjusting fastener can be utilized. The self-adjusting fastener is configured to fit multiple opening sizes, thereby allowing a single fastener and bolt size to be used to attach the impact absorbing cover to equipment. For example, single size of the self-adjusting fastener can be used for wide variety of flange sizes comprising bolt holes of various sizes.

The self-adjusting fastener centers itself in various sizes of bolt holes and securely attaches the impact absorbing cover to equipment.

The self-adjusting fastener can have a planar end surface, a distal rim, a tapered intermediate sidewall surface joining the planar end surface and distal rim, and a threaded central bore for engaging a mating bolt.

The tapered intermediate surface can be sized to be at least partly received in an opening, such as a bolt hole, such that the tapered intermediate sidewall surface contacts the internal diameter of the opening.

Figure 1A:
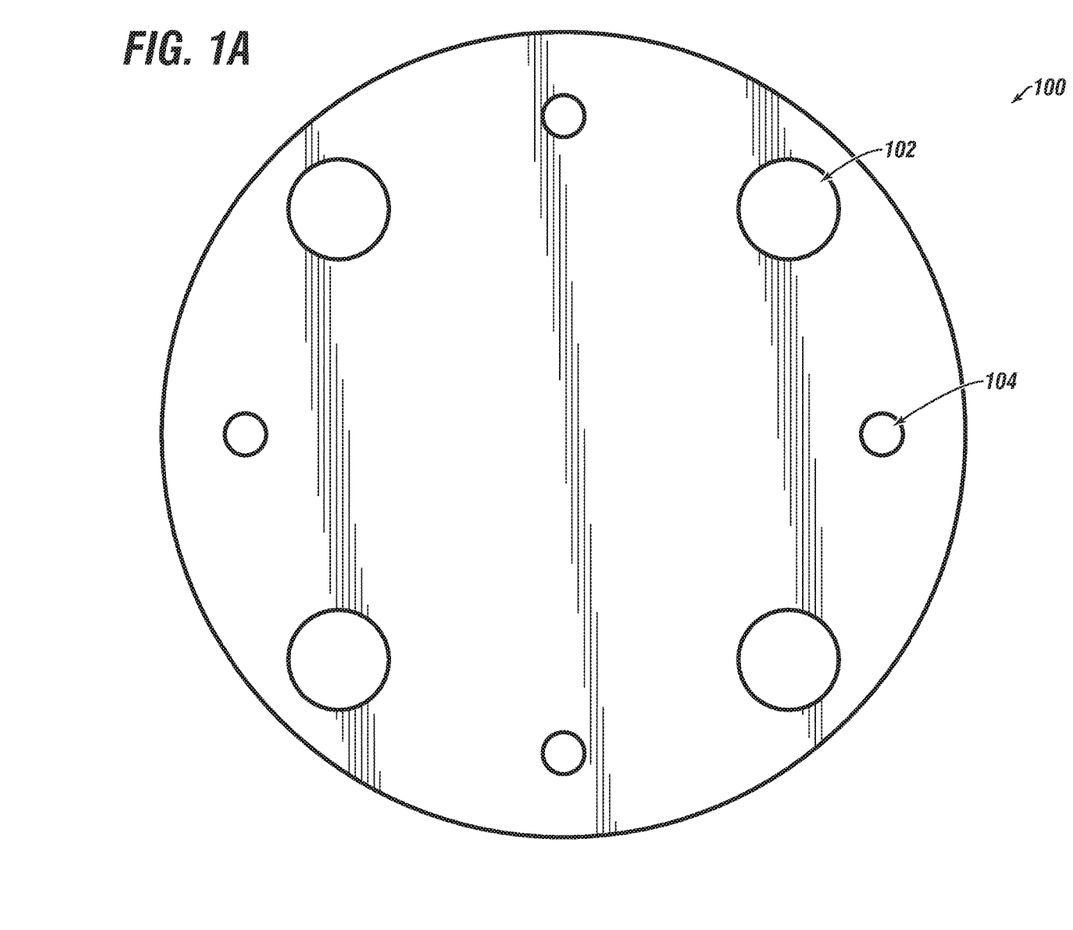
FIG. 1A is a top view of an impact absorbing cover according to one or more embodiments.

Turning now to the Figures, FIG. 1A is a top view of an impact absorbing cover according to one or more embodiments. An impact absorbing cover 100 used for a typical flange, such as those attached to piping, pumps, compressors, and the like is shown. The impact absorbing cover 100 can have a bolt hole 102 of the same diameter as bolt holes in the flange, or an alternate hole 104 for use with a self-adjusting fastener.

Figures 1B, 1C:
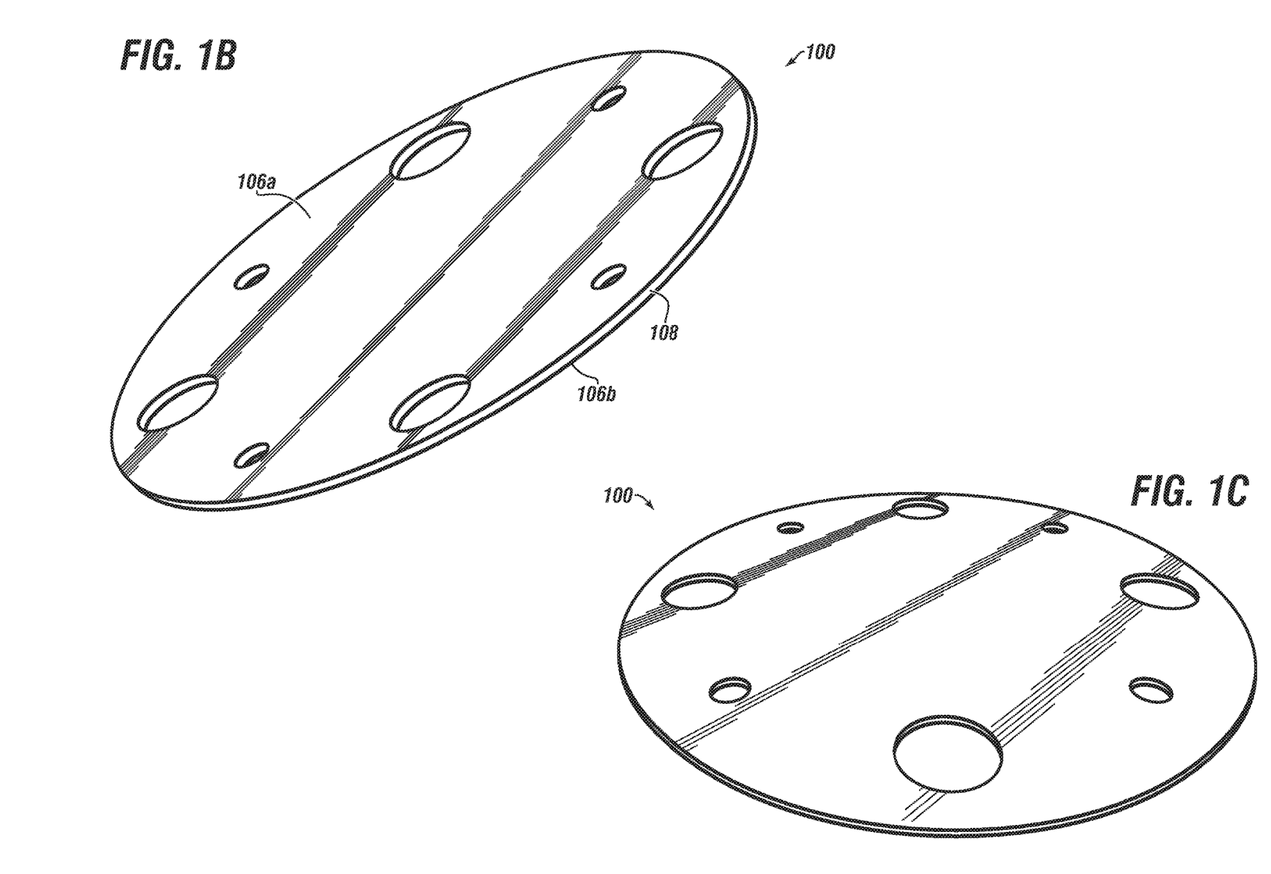
FIG. 1B is an orthographic projection view of an impact absorbing cover according to one or more embodiments.
FIG. 1C is a perspective view of an impact absorbing cover according to one or more embodiments.
Figure 2A:
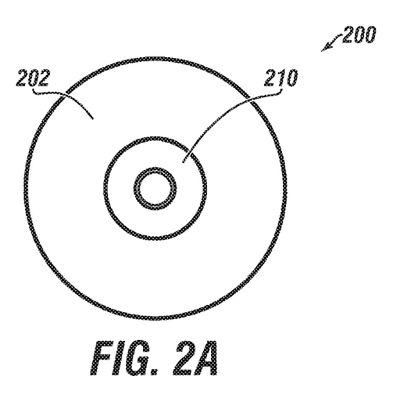
FIG. 2A is a top view of a self-adjusting fastener according to one or more embodiments.
Figure 2B:
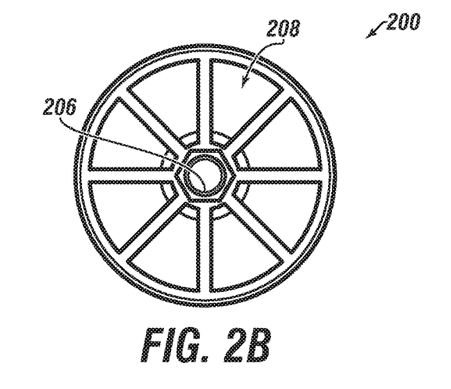
FIG. 2B is a bottom view of a self-adjusting fastener according to one or more embodiments.
Figure 2C:
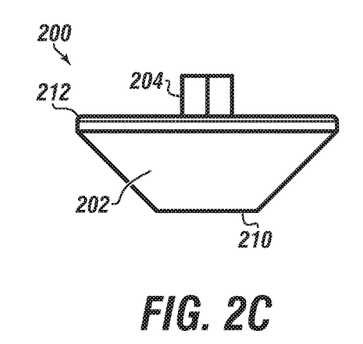
FIG. 2C is a side view of a self-adjusting fastener according to one or more embodiments.
Figure 2D:
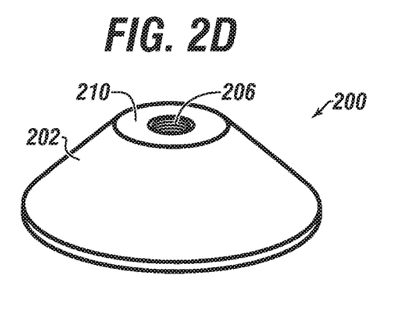
FIG. 2D is a perspective view of a self-adjusting fastener according to one or more embodiments.
Figure 2E:
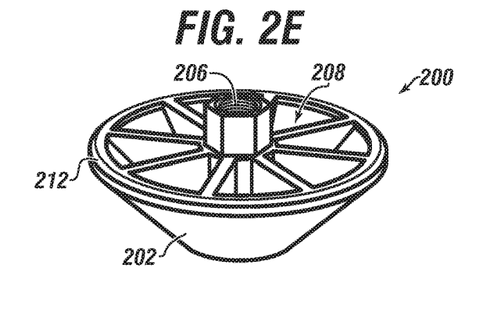
FIG. 2E is a perspective view of a self-adjusting fastener according to one or more embodiments.
Figure 2F:
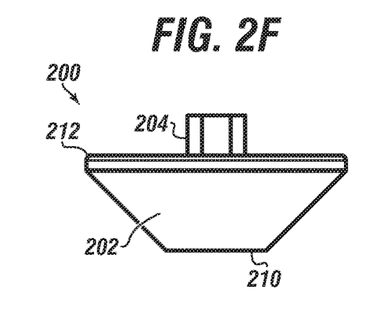
FIG. 2F is a side view of a self-adjusting fastener according to one or more embodiments.

FIG. 1B is an orthographic projection view of an impact absorbing cover according to one or more embodiments. In this embodiment, the impact absorbing cover 100 is shown with at least one rigid layer 106a and 106b and a deforming layer 108.

FIG. 1C is a perspective view of an impact absorbing cover 100 according to one or more embodiments.

FIGS. 2A-2F show various views of a self-adjusting fastener usable with one or more embodiments of the invention.

Referring to FIGS. 2A, 2B, 2C, 2D, 2E and 2F, the self-adjusting fastener 200 can have a planar end surface 210 and a distal rim 212. The planar end surface 210 and the distal rim 212 can be joined by a tapered intermediate sidewall surface 202. As is evident to persons having ordinary skill in the art, any bolt hole having a diameter intermediate to the outer diameter of the planar end surface 210 and distal rim 212 can receive and center the self-adjusting fastener.

The self-adjusting fastener 200 can have a threaded central bore 206 for engaging a mating bolt.

The self-adjusting fastener 200 can also have void 208 created within to make it lighter, as well as facilitate manufacturing. In embodiments, all wall thicknesses are substantially the same to facilitate manufacturing via injection molding. It is desirable to select a plastic or thermoplastic material for the self-adjusting fastener 200 in order to make it light, strong, durable, and cost efficient to manufacture.

In embodiments, the self-adjusting fastener 200 can have an extension 204, which can be configured to be gripped with a tool.

Figure 3A:
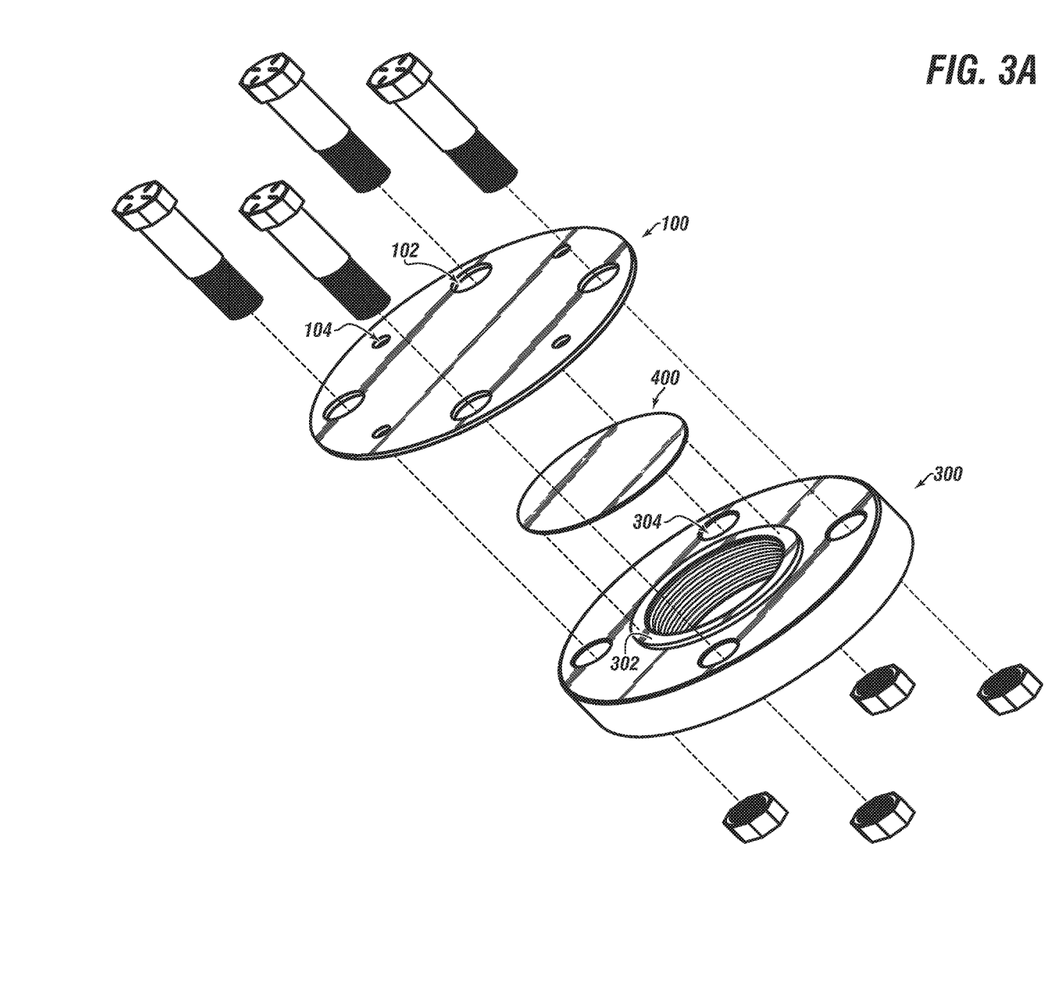
FIG. 3A is an exploded view of the system for protecting an equipment surface according to one or more embodiments.

FIG. 3A is an exploded view of the system for protecting an equipment surface according to one or more embodiments.

Shown here is a typical piece of equipment upon which the present system can be applied. Flange 300 is shown with a machined surface 302, and bolt holes 304. It is desirable to protect the machined surface 302 from being nicked or dented to maintain a suitable sealing surface. It is also desirable not to have any residue on the machined surface 302.

An adhered surface cover 400 can be applied to the machined surface 302. In a typical application, the outer diameter of the adhered surface cover 400 will be substantially identical to the machined surface 302. This will allow for treatments to the flange 300 prior to the attachment of the impact absorbing cover 100, such as abrasive blasting or painting, without damage to the machined surface 302.

Impact absorbing cover 100 can be aligned with the flange 300 and bolted on using a fastener, such as a standard nut and bolt.

Figure 3B:
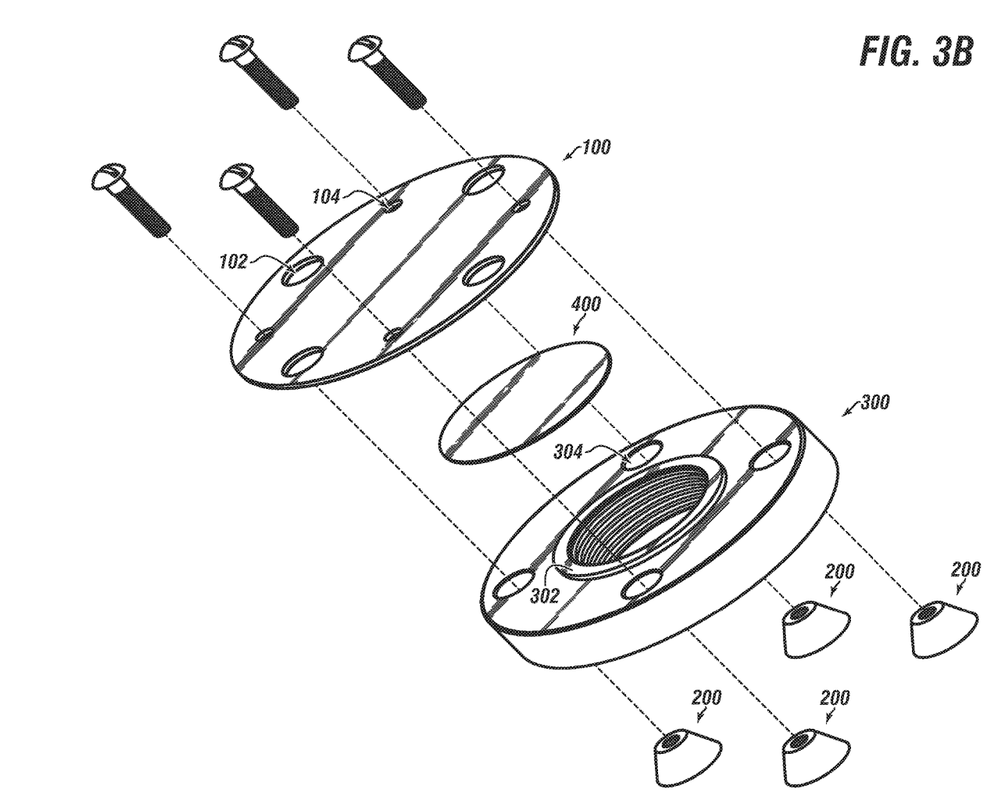
FIG. 3B is an exploded view of the system for protecting an equipment surface according to one or more embodiments.

FIG. 3B is an exploded view of the system for protecting an equipment surface according to one or more embodiments.

In embodiments, the impact absorbing cover 100 can be aligned with the flange 300 and bolted on using a standard bolt or screw in conjunction with a self-adjusting fastener 200.

Figure 4A:
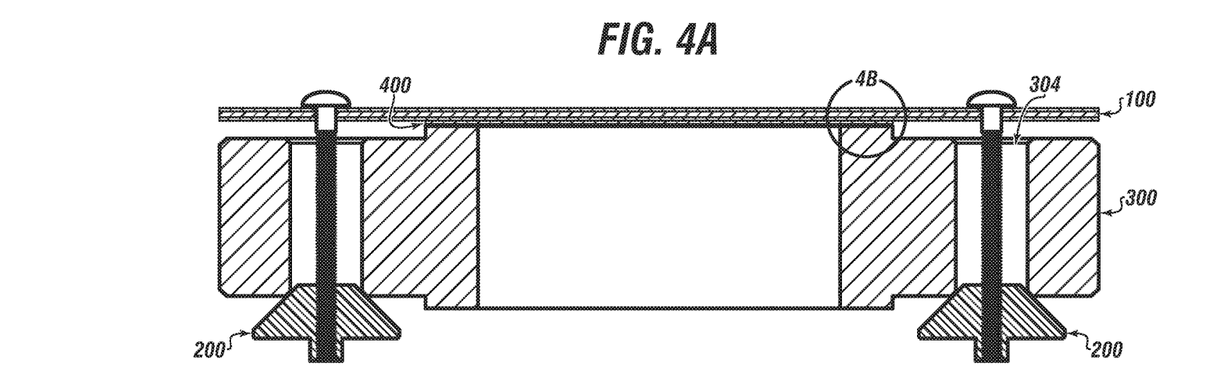
FIG. 4A is a cut view of the system for protecting an equipment surface according to one or more embodiments.
Figure 4B:
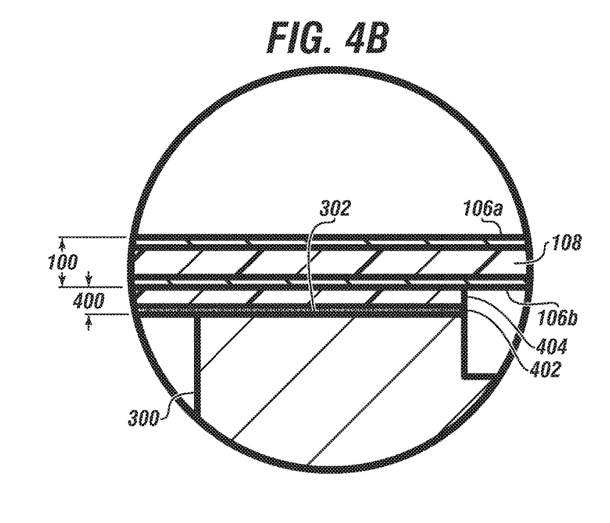
FIG. 4B is a detail view of the system for protecting an equipment surface as shown in FIG. 4A according to one or more embodiments.

FIG. 4A is a cut view of the system for protecting an equipment surface according to one or more embodiments. FIG. 4B is a detail view shown in FIG. 4A.

Shown here is a cut view of a fully assembled embodiment of the system for protecting an equipment surface.

Impact absorbing cover 100 is shown with two rigid layers 106a and 106b sandwiching a deforming layer 108. The impact absorbing cover 100 can be attached to the flange 300 by using a standard bolt or screw in conjunction with a self-adjusting fastener 200. It is evident here that the tapered intermediate sidewall surface 202 both adjusts the self-adjusting fastener 200 for the size of bolt hole 304, and aligns the self-adjusting fastener 200 with the center of the bolt hole 304.

More clearly visible in these Figures is the adhered surface cover 400 with a material 404 to provide an airtight seal. The adhered surface cover 400 can be affixed to the machined surface 302 with an adhesive 402.

While the invention has been described with emphasis on the presented embodiments and Figures, it should be understood that within the scope of the appended claims, the invention might be practiced other than as specifically enabled herein.

What is claimed is:

1. A system for protecting an equipment surface comprising:
    a) an adhered surface cover having an inner side that is adhered to the equipment surface, the adhered surface cover comprising:
        i) a fluoropolymer;
        ii) an acrylonitrile butadiene styrene;
        iii) an acrylic;
        iv) a nylon;
        v) a polylactic acid;
        vi) a polybenzimidazole;
        vii) a polycarbonate;
        viii) a polyether sulfone;
        ix) a polyetherether ketone;
        x) a polyetherimide;
        xi) a polyethylene;
        xii) a polyphenylene oxide;
        xiii) a polyphenylene sulfide;
        xiv) a polypropylene;
        xv) a polyester;
        xvi) a polystyrene; or
        xvii) a polyvinyl chloride;
    b) an impact absorbing cover provided on an outer side of the adhered surface cover; and
    c) a fastener for attaching the impact absorbing cover to the equipment surface.

2. The system of claim 1, wherein the adhered surface cover comprises a water based adhesive.

3. The system of claim 1, wherein the adhered surface cover is configured to provide an airtight seal.

4. The system of claim 1, wherein the adhered surface cover comprises a material which withstands abrasive blasting.

5. The system of claim 1, wherein the impact absorbing cover comprises a deforming layer.

6. The system of claim 5, wherein the deforming layer comprises a thermoplastic.

7. The system of claim 1, wherein the impact absorbing cover comprises a rigid layer.

8. The system of claim 7, wherein the rigid layer is a metal.

9. The system of claim 7, wherein the impact absorbing cover comprises a coating.

10. The system of claim 1, wherein the fastener is configured to self-center when tightened for multiple sizes of equipment.

11. The system of claim 10, wherein the fastener comprises a tapered member, a receiving thread, and a threaded insert to engage the receiving thread.

12. The system of claim 10, wherein the fastener comprises an extension to allow for grasping with a tool.

13. A system for protecting an equipment surface comprising:
    a) an adhered surface cover having an inner side that is adhered to the equipment surface, the adhered surface cover comprising a water based adhesive;
    b) an impact absorbing cover comprising a rigid layer and a deforming layer provided on an outer side of the adhered surface cover; and
    c) a fastener for attaching the impact absorbing cover to the equipment surface, wherein the fastener is configured to self-adjust for multiple openings.

14. A self-adjusting fastener for joining two members, wherein the members have openings with given internal diameters formed therein, the self-adjusting fastener comprising:
    a) a planar end surface;
    b) a distal rim;
    c) a tapered intermediate sidewall surface joining the planar end surface and distal rim;
    d) a threaded central bore for engaging a mating bolt; and
    e) an extension to allow for grasping with a tool; and
        wherein the tapered intermediate sidewall surface is sized to be at least partly received in an opening such that the tapered intermediate sidewall surface contacts the internal diameter of the opening and the fastener self-centers when tightened.

* * * * *